United States Patent [19]

Laverman

[11] 4,238,953
[45] Dec. 16, 1980

[54] EMISSION TEST METHOD FOR FLOATING ROOF SEALS AND APPARATUS USEFUL THEREFOR

[75] Inventor: Royce J. Laverman, South Holland, Ill.

[73] Assignee: Chicago Bridge & Iron Company, Oak Brook, Ill.

[21] Appl. No.: 39,508

[22] Filed: May 16, 1979

Related U.S. Application Data

[63] Continuation-in-part of Ser. No. 887,185, Mar. 16, 1978, abandoned.

[51] Int. Cl.³ .............................................. G01M 3/20
[52] U.S. Cl. ................................................. 73/40.7
[58] Field of Search ............... 73/40.7, 40, 46, 49.2, 73/49.3, 49.8; 220/224, 226, 227

[56] References Cited

U.S. PATENT DOCUMENTS

| | | | |
|---|---|---|---|
| 2,559,564 | 7/1951 | Sperling | 73/40.7 X |
| 2,696,930 | 12/1954 | Moyer | 220/224 |
| 3,136,444 | 6/1964 | Moyer | 220/226 |
| 3,364,729 | 1/1968 | Yearwood | 73/49.3 X |
| 3,572,096 | 3/1971 | Meyer | 73/40.7 |
| 3,577,769 | 5/1971 | Roberts | 73/40.7 |
| 3,913,341 | 10/1975 | Katsuta | 73/40.7 X |
| 3,949,596 | 4/1976 | Hawk | 73/40.7 |
| 3,980,199 | 9/1976 | Kays | 220/227 |

*Primary Examiner*—Gerald Goldberg
*Assistant Examiner*—Joseph W. Roskos
*Attorney, Agent, or Firm*—Merriam, Marshall & Bicknell

[57] ABSTRACT

A method of and apparatus for testing the effectiveness against leakage of a seal in a gap between two surfaces which comprises positioning and securing an envelope to span the seal and gap and extend to the two surfaces to thereby form an enclosed cavity or space defined by the two surfaces, the seal therebetween and the envelope; feeding a gas stream into the cavity and removing the gas stream from the cavity; and analyzing the removed gas stream for any potential contaminant which leaks past the seal in the gap. The method is useful for testing the seal on a floating roof storage tank, such as for liquid petroleum products.

39 Claims, 9 Drawing Figures

EMISSION TEST METHOD FOR FLOATING ROOF SEALS AND APPARATUS USEFUL THEREFOR

This application is a continuation-in-part of pending U.S. patent application Ser. No. 887,185 filed Mar. 16, 1978 now abandoned.

This invention relates to methods and apparatus for determining the effectiveness of seals against vapor or gas escape or leakage, such as seals in floating roof liquid storage tanks.

There are many instances in industrial apparatus where is is necessary to leave a gap or space between two surfaces or objects, even though it would be desirable, if practically possible, to avoid the gap by directly joining the two surfaces together. Avoiding a gap is particularly desirable when a somewhat volatile or highly volatile liquid is present which can release vapors or gases that can flow through the gap into the atmosphere or other environment. Since a gap is often unavoidable, various types of seals are used to bar vapor or gas flow therethrough.

One type of industrial structure which is used to store liquid products of a volatile nature, and which has a number of gaps or clearance spaces between adjacent surfaces or objects, is a floating roof tank which can be open at the top or covered by an outer roof. Gaps or clearance spaces occur where apparatus penetrates the floating roof, such as pontoon rim vents, automatic bleeder vents, gauge or float wells, guide pole penetrations, ladder penetrations, column penetrations, double deck water drains and leg support pipe penetrations. Various seals are used at such penetrations to restrict flow of volatile emissions from a liquid product in the tank through the gaps. The major source of emissions, however, is through the rim space of a floating roof tank.

In a conventional floating roof tank, there is provided a clearance space or rim space between the tank side wall and the vertical rim or edge of the roof. It is necessary to provide clearance space to permit unrestrained vertical travel of the roof within the tank. The clearance space is of sufficient size that local dimensional variations in the circularity of the tank sidewall or shell, commonly called out-of-roundness, which can result from uneven foundation settlement, imprecise fabrication or erection, or unusual live loads such as high winds and the like, do not hamper vertical travel of the roof.

A conventional system for centering a floating roof in a tank and simultaneously sealing the rim space between the roof edge and the tank inner side wal employs as a sealing means a yieldable annulus suspended by the roof and extending from contact with the roof rim into contact with the tank wall. The annulus can be made of flexible sheet material and can contain a fluid, i.e., liquid or gas, such as water or nitrogen, or a resilient material such as a polymeric foamed material. U.S. Pat. Nos. 3,136,444; 3,120,320; 3,075,668; 3,055,533; 2,973,113 and 2,968,420 illustrate seals of those types.

Other apparatus to maintain the roof centered in the tank and to effect a seal against evaporation loss uses a plurality of vertical shoes adapted to slidably contact the entire circular vertical inner side wall of the tank and means supported by the roof, such as pantagraph hangers, for pressing the shoes against the inner side wall, as well as to support the shoes. Vapor loss between the roof and shoes is prevented by a flexible nonpermeable fabric barrier which extends from the upper part of the shoes to the floating roof top edge. Such apparatus is disclosed in many U.S. patents including U.S. Pat. Nos. 2,587,508; 2,630,937; 2,649,985 and 2,696,930.

Although such types of seals function quite well in commercial installations, some product vapor may still escape past the seal. This possibility is substantially increased on windy days since air flow over the floating roof creates a differential pressure over part of the circumference at the seal. The greater wind pressure will usually be located in the semi-circular rim clearance space downwind from the center of the roof and the lesser pressure upwind. When the lesser pressure is created, the higher vapor pressure leads to flow of vapor, from beneath the sealing means, between the seal and the tank inner wall into the atmosphere. Similarly, the greater pressure causes air to flow into the vapor space, thereby setting up a flow around the vapor space and out the lesser pressure side carrying vapor with the flow. This results in increased air pollution.

To evaluate the effectiveness of existing and new floating roof rim space seals in restricting emissions, various apparatus and methods have been previously developed. One method involved measuring stock volume decrease and another method measured changes in the stock properties. These two methods, however, require from several months to years to obtain significant results due to the very small changes which occur with time in the stock volume and stock properties such as vapor pressure and liquid density. A need therefore exists for apparatus and methods for measuring and evaluating the effectiveness of floating roof rim space seals as well as seals used elsewhere on floating roof tanks and other structures which employ seals to restrict flow of vapors or gases between gaps and clearance spaces.

According to one aspect of the subject invention there is provided a method of testing the effectiveness against leakage of a seal in a gap between two surfaces which comprises positioning and securing an envelope means to span the seal and gap and extend to the two surfaces to thereby form an enclosed cavity or space defined by the two surfaces, the seal therebetween and the envelope means; feeding a gas stream into the cavity and removing the gas stream from the cavity; and, analyzing the removed gas stream for any potential contaminant which leaks past the seal in the gap.

The envelope means can be made of rigid material but desirably is formed of a flexible, gas impervious membrane. When the gap is elongated, whether straight or curvilinear, the membrane can be an elongated strip joined at its longitudinal edges to the two surfaces thereby defining an elongated cavity.

To obtain an adequate flow of gas in the cavity, and to measure the effectiveness of a suitable length of seal, it is desirable for the gas stream to be fed in one end of the cavity and to remove a stream of gas from the other end of the cavity. The cavity, for example, can constitute essentially the entire circumferential space above the seal of a floating roof. The gas can be caused to flow in both directions from an inlet to the cavity to an outlet positioned about diametrically from the inlet or the gas flow can be controlled to go from an inlet to the cavity, to an outlet near, but separated from the inlet, such as one located about 360° from the inlet.

The described method is especially useful for testing the effectiveness against leakage of a seal of the rim space between a floating roof edge and a tank containing the floating roof, such as a roof floating on a liquid product containing a volatile component which constitutes the potential contaminant. For such a test, the envelope means can be positioned and secured to extend from the floating roof edge to the tank wall over at least part of the length of the rim space to thereby form an enclosed cavity or space defined by the tank wall, the seal, the roof edge and the envelope means. To more closely simulate the air speed and circumferential pressure distribution above the floating roof seal caused by the natural flow of wind over the tank, spaced apart vertical screens can be radially positioned in the cavity.

According to a second aspect of the invention, there is provided apparatus for evaluating the effectiveness of a vapor seal which comprises a first object having a first surface; a second object having a second surface; a gap between the first and second surfaces; a seal in the gap intended to restrict vapor flow from one side to the other side of the gap; an envelope means spanning the seal and gap and joined to the first and second surfaces thereby forming an enclosed cavity or space defined by the first and second surfaces, the seal and the envelope means; a first conduit means for feeding a gas stream through the envelope into the cavity; and, a second conduit means for removing a gas stream through the envelope from the cavity and delivering at least a part of the removed stream to an analyzer for a potential atmosphere contaminating vapor which leaks past the seal.

The first conduit of such apparatus can communicate with one end of the cavity, and the second conduit can communicate with the other end of the cavity. Also, the gap can be elongated and when it is the envelope means can be elongated, whether it is rigid or flexible. The envelope can be a flexible, gas impervious elongated membrane in the form of a strip joined at its longitudinal edges to the first and second surfaces to define an elongated cavity.

Apparatus for evaluating the effectiveness of floating roof rim seals comprises, in combination, a storage tank having a circular cylindrical vertical wall; a floating circular roof in the tank; a rim space between the roof edge and the tank wall; an envelope means secured to the floating roof edge and extending over at least part of the length of the rim space to, and secured to, the tank wall, thereby forming an enclosed curvilinear cavity or space defined by the tank wall, the seal, the roof edge and the envelope means; a first conduit means for feeding a gas stream through the envelope into the cavity; and, a second conduit means for removing a gas stream from the cavity through the envelope and delivering at least a part of the removed stream to an analyzer for a potential atmosphere contaminating vapor which leaks past the seal.

The envelope can extend completely around the roof edge over the entire rim space to the tank wall to thereby define a circular cavity. The first conduit and the second conduit can be diametrically positioned as to each other so that the feed gas to the cavity divides and each half travels in about equal volume through a semi-circular path to the second conduit outlet. Alternatively, a barrier can be positioned in the cavity to substantially prevent gas or vapor flow from one side of the barrier to the other side, and the first conduit can be located to communicate with the cavity close to one side of the barrier and the second conduit can be positioned to communicate with the cavity close to the other side of the barrier.

The invention will be described further in conjunction with the attached drawings, in which.

So far as is practical, the same or similar parts or elements which appear in the various views of the drawings will be identified by the same numbers.

Figure 1:
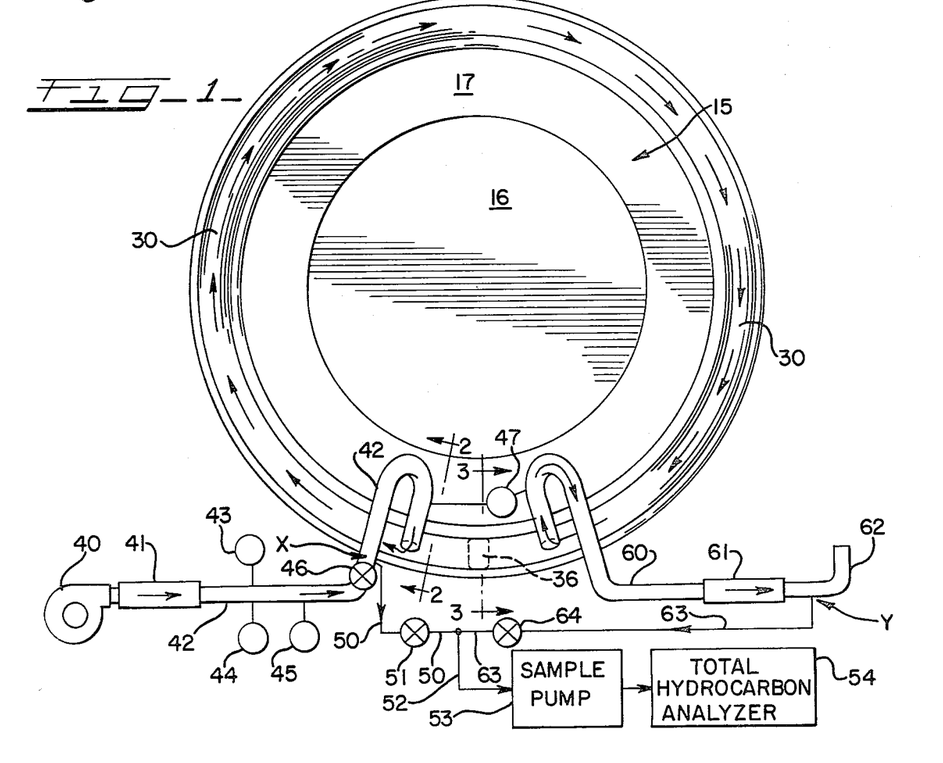
FIG. 1 is a plan view of a floating roof tank equipped for evaluating the effectiveness of a rim space seal.
Figure 2:
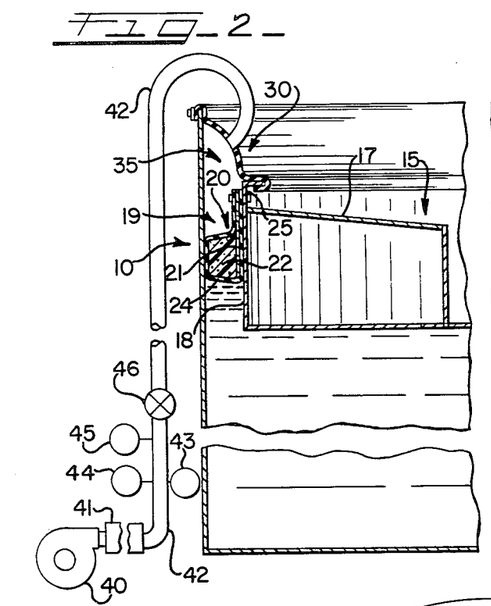
FIG. 2 is a sectional view taken along the line 2—2 of FIG. 1.
Figure 3:
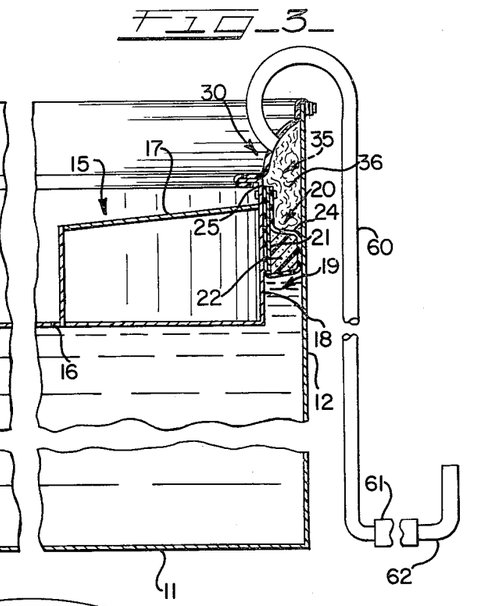
FIG. 3 is a sectional view taken along the line 3—3 of FIG. 1.

With reference to FIGS. 1 to 3, the floating roof tank comprises a tank 10 and a floating roof 15. The tank 10 has a flat horizontal circular metal bottom 11 and a vertical cylindrical circular wall 12. Floating roof 15 has a substantially flat circular metal center portion 16 with a pontoon ring or float 17 around the periphery of center portion 16. The pontoon 17 has an outer vertical wall or side 18 spaced inwardly from the inner surface of tank wall 12 thereby defining a rim space or clearance gap 19 therebetween.

Mounted on the floating roof side 18 is a seal 20. Seal 20 is made of a vertical metal plate 21 to which a horizontal resilient polymeric foam ring 22 is adhesively bonded along the outer side portion. A rubber impregnated fabric 24 is then wrapped around the foam ring 22 and brought upwardly to the front and back top edges of metal plate 21. Bolts or other fastening means then join the top edges of the metal plate 21 and fabric 22 to the flange 25 at the top of the roof edge. Such a seal is of conventional construction.

The floating roof 15 is brought to near the top of the tank by pumping a storage product, such as a petroleum product or other liquid containing a volatile potentially atmosphere contaminating component, into the tank. Envelope 30 is then positioned to span the rim space 19. Envelope 30, in the embodiment illustrated by FIGS. 1 to 3, is an elongated flexible membrane. It can be a vapor or gas impervious strip of rubber, polyethylene, impregnated fabric or equivalent material. It could also be made of rigid or semi-rigid material such as sheet steel or aluminum. Desirably, however, the envelope 30 is made of flexible non-metallic material such as a nylon reinforced clear plastic sheet.

One longitudinal edge of envelope 30 is joined to the top edge of tank wall 12 and the other longitudinal edge of envelope 30 is joined to the top edge of floating roof 15. Any suitable fastening means such as clips, clamps, bolts, pressure sensitive tape, magnets and the like can be used provided that an essentially gas tight temporary joint is obtained. The envelope 30 together with the adjacent tank wall 12 portion, seal 20 and floating roof top edge portion define an enclosed cavity 35 which can extend around the rim space as far as desired. The embodiment of the invention illustrated by FIGS. 1 to 3 is intended to evaluate the effectiveness of the entire length of seal 20 in one operation rather than a portion of it. The cavity 35 thus extends nearly around the rim space but is terminated just short of a complete circle by a barrier 36 which vertically fills or occupies a vertical area in the cavity to bar circular flow of a gas or vapor in the cavity. The barrier 36 can be, for example, a vertical sheet, a block of resilient polymeric foam or a low pressure inflated ballon. The result of the barrier 36 is to produce a double ended cavity 35. Of course, if only a portion of seal 20 is to be tested, two such spaced-apart barriers would be employed to isolate a seal section for test purposes.

Blower or pump 40 (FIGS. 1 to 3), desirably mounted on the ground, communicates with air flow straightener section 41 from which air is delivered to conduit 42 which extends to one end of cavity 35 on one side of barrier 36. Valve 46 is positioned in conduit 42 to regulate the air flow rate. Air flow rate indicator 43, blower discharge air temperature indicator 44 and blower discharge air pressure indicator 45 are operatively connected to conduit 42. A blower discharge air sample line 50, containing valve 51, extends from conduit 42 to line 52 which communicates with sample pump 53. Sample pump 53 delivers the air or other gas sample to analyzer 54. Conduit 60 communicates at one end with the outlet end, or down-stream end, of cavity 35 and at the other end it is joined to air flow mixing section 61 from which the air is vented to the atmosphere through pipe 62. Sample line 63 communicates with pipe 62 at one end and with pipe 52 at the other end. Valve 64 is positioned in line 63 to control the gas or air flow.

The described apparatus is used to test the effectiveness of seal 20 against hydrocarbon emissions from a petroleum product in the tank by first actuating blower 40. The air stream from blower 40 passes through air flow straightener 41 into conduit 42 which feeds it into the inlet end of cavity 35. The air flows in a curvilinear path along the cavity and as it does so any hydrocarbon emissions which leak past the seal 20 are mixed with the air. The air stream is removed, together with accumulated emissions, from the cavity 35 by means of conduit 60.

Air samples are taken from the inlet feed stream at sample point X since it is important to know if the air contains any emission components before it is fed to the cavity so that the initial amounts can be substracted from the total emission measured by the sample removed at sample point Y of the exit stream. Valve 64 would be closed and valve 51 open when the sample from sample point X is analyzed, and valve 51 would be closed and valve 64 open when the sample from sample point Y is analyzed. The signal from analyzer 54 could be recorded so that a continuous record of either the cavity entrance emission concentration level or the cavity exit emission concentration can be made.

One generally important element in performing emission tests with this test method is to use a controlled flow rate of air so that as the air moves through the seal test cavity, not only does it collect the seal emissions for sampling and analysis, but it also simulates the same local air speed and circumferential pressure distribution that the wind would produce above the seal. To achieve the proper pressure distribution around the seal test cavity, a differential pressure indicator 47 which measures the air pressure difference between each end of the seal test cavity, can be used in selecting and setting the proper air flow rate.

In addition to the air flow isolation barrier 36 placed inside the seal test cavity, it may be necessary to place a temporary gas flow isolation dam below the seal at the same location as the air flow isolation barrier to eliminate leakage of the test air down past the seal and under the air flow isolation barrier into the outlet section of the seal test cavity. One such arrangement is shown in FIG. 4.

Figure 4:
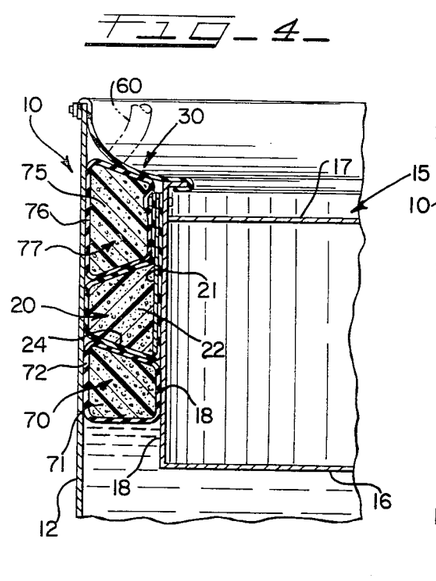
FIG. 4 is a vertical sectional view through the edge of a floating roof having a resilient polymeric foam rim space seal.

The seal 20 shown in FIG. 4 is like that shown in FIGS. 1 to 3 except that in FIG. 4 the seal 20 is not positioned quite so low on the side 18 of the roof. To prevent flow of vapor or emissions in a horizontal circular path a dam 70 is positioned beneath the seal 20. Dam 70 is a resilient polymeric foam log 71 covered with a vapor proof sheet material 72. A similar resilient polymeric log 75 covered with a vapor proof sheet material 76 is used as a barrier 77 above seal 20 to substantially block off the upper part of the rim space and thereby create a cavity with ends.

Figure 5:
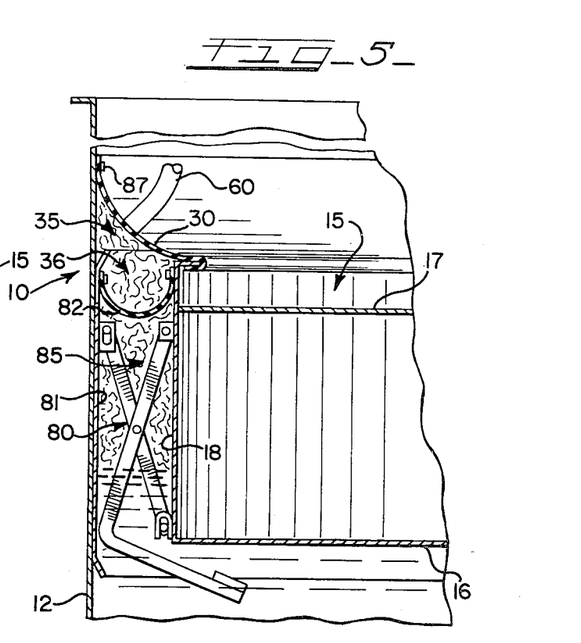
FIG. 5 is a vertical sectional view through the edge of a floating roof having a fabric seal extending from the tank roof to shoes, supported by the roof edge, in contact with the tank wall.

FIG. 5 illustrates how the invention can be employed to test the seal on a floating roof using shoes and pantagraph hangers for the shoes. The pantagraph hangers 80 support shoes 81 in slidable contact with the inner surface of tank wall 12. The space between the shoes 81 and side 18 of the floating roof 15 is covered by a flexible vapor impermeable fabric 82 which is joined to the roof and shoes at its side edges. A barrier 85 is positioned in the space beneath fabric 82. This barrier can be made of a mass of farbric, polymeric foam or a low pressure balloon. A barrier 36 is positioned above barrier 85 to prevent flow of vapor or gas in a circle around the tank rim.

In the embodiment shown in FIG. 5 the outer edge of envelope 30 is temporarily joined to the tank wall surface by a series of magnets 87. This fastening means eliminates the need to make holes in the tank wall, or the use of an adhesive to get the desired bond, or raising the floating roof to near the tank top edge to join the envelope thereto as shown in FIGS. 1 to 4.

Figure 6:
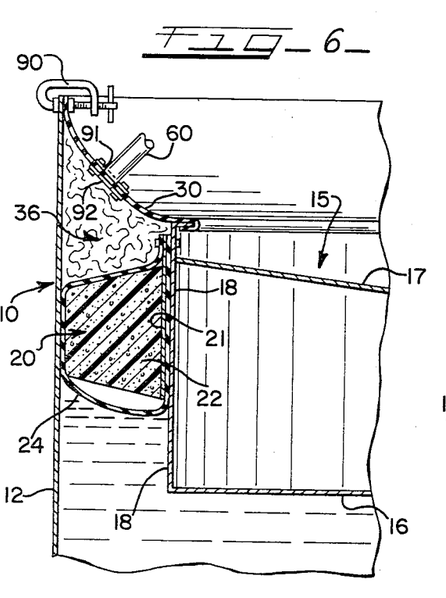
FIG. 6 is a vertical sectional view through the edge of a floating roof having a resilient polymeric foam rim space seal and an envelope clamped to the tank top edge.

FIG. 6 illustrates the use of clamps 90 to temporarily bond the top edge of envelope 30 to the top edge of the tank. It also shows how the conduit 60 (or 42) can be readily jointed in a leak proof manner to the envelope. A plate 91 is mounted on the end of conduit 60 and a similar plate 92 is placed inside of the envelope. Each plate 91 and 92 has a central hole which is aligned with a similar hole in the envelope. Bolts or similar fasteners are then extended through both plates, with the envelope material therebetween, to join the conduit end to the envelope.

Figure 7:
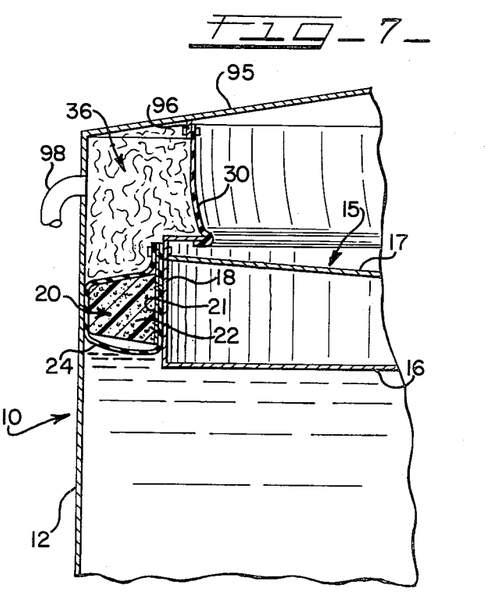
FIG. 7 is a a vertical sectional view through the edge of a floating roof tank having a conical outer roof.

FIG. 7 illustrates application of the invention to a floating roof tank having an outer conical roof 95. The floating roof 15 is raised floating on liquid product in tank 10 to near the outer roof 95. Then envelope 30 is positioned to extend from the edge of the floating roof to a flanger 96, on the inside of outer roof 95, to which it is temporarily secured. A barrier 36 is positioned in the space above seal 20 extending to the outer roof 95, envelope 30 and wall 12 to prevent emissions from flowing in a circular path as previously explained. Breather pipe 98 is blocked off or if desired one of the conduits 42 or 60 can be joined to it if advantageously positioned.

When performing emission tests using the invention, it is important to use a carefully controlled flow rate of air so that as the air moves through the seal test cavity, not only does it collect the seal emissions for sampling and analysis, but it also simulates both the same local air speed and circumferential pressure distribution that the wind would produce above the seal under service conditions. To achieve both of these requirements, a suitable number and type of radially positioned vertical screens can be located in spaced apart position inside the seal test envelope. The pressure drop characteristics of only the air flow space inside the seal test envelope generally will not simulate as closely as desired the affects of the wind on the emissions from the seal. However, by using a suitable number and type of screens spaced inside the seal test envelope, wind affects can be very closely simulated.

It was previously known that the average air speed above the seal of a commerical floating roof tank is approximately 25% of the wind speed over the floating roof tank. By measuring the wind spped over the tank, and by taking air pressure measurements at spaced-apart positions over the seal, the pressure distribution around the rim space can be determined for a specific wind speed. The resulting data provides a standard which can be duplicated by the test system of the invention to thereby simulate operating conditions. Of course, additional standards can be determined in this way for different wind speeds.

Once the wind speed conditions to be simulated have been decided upon, the air speed through the cavity can be set and the desired pressure drop therein can be controlled by positioning spaced-apart radially located vertically arranged screens in the cavity. The size and number of screens used can be arrived at by using the known pressure drop versus flow characteristics of screens. For testing the seals on a floating roof tank according to the invention, a suitable pressure drop can be effected by using a standard readily available insect screen such as is used on house windows and doors. One suitable screen is 16×18 mesh (i.e., 16 wires per inch of screen length and 18 wires per inch of screen width) with 0.011 in. diameter wire.

Figures 8, 9:
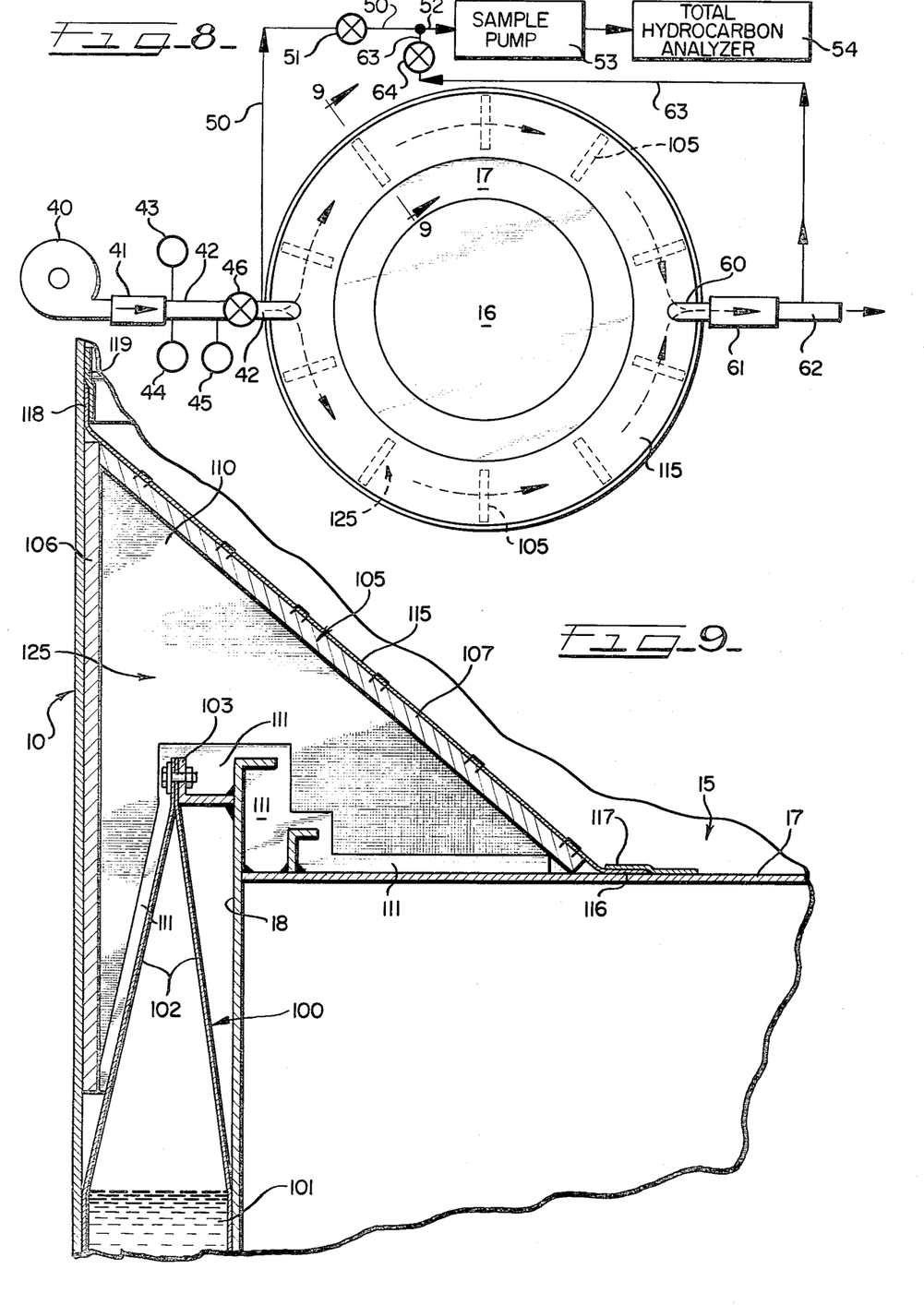
FIG. 8 is a plan view of a floating roof tank equipped for evaluating the effectiveness of a rim space seal by splitting the incoming stream of gas and passing it through a cavity containing spaced-apart screens.
FIG. 9 is a sectional view taken along the line 9—9 of FIG. 8.

The attached FIGS. 8 and 9 illustrate use of the apparatus provided by the invention with a liquid filled type of seal. The apparatus employs screens in the cavity to effect a predetermined pressure drop as the test gas flows through the cavity. The apparatus as illustrated in FIG. 8 employs pumps and ancillary valves and gauges already described herein at least with respect to FIGS. 1 and 2 so that these elements now shown in FIG. 8 will not be described again.

As shown in FIGS. 8 and 9, the floating roof side 18 supports a seal 100 in the rim space between the roof and the tank wall. Seal 100 comprises a liquid 101 in flexible fabric pouch 102, extending completely around the roof rim, supported by flange 103.

Ten triangular shaped frames 105 are positioned vertically about equally spaced-apart so that they contact the tank wall and the floating roof top edge portion, and extend downwardly into the rim space between seal 100 and the tank wall. Each frame has a vertical wooden strip 106 and a sloped wooden strip 107. Suitable wire screen 110 is fastened to each side of each frame 105, although with some screening only one screen wall may be adequate. A total of twenty screens on ten frames are thus used in this embodiment. To substantially prevent leakage of gas under and around the screen 110, strips of a suitable pressure sensitive tape 111 extend from the screen bottom edges to the surfaces of the floating roof 15 and to seal 100.

A clear plastic film envelope 115 is joined by staples to the top of each sloped wooden strip 107 of each fram 105. The envelope extends completely around the rim space and it has its inner edge 116 fastened by pressure sensitive tape 117 to the top of the floating roof. The outer edge 118 of the envelope 115 is fastened to the tank wall by pressure sensitive tape 119. In this way, a substantially leak free cavity 125 is formed beneath envelope 115.

Conduit 42 delivers the test gas, which is usually air, beneath envelope 115 into cavity 125. The air flow divides essentially in half so that about one-half flows clockwise, around about one-half of the cavity, and the other one-half flows counter-clockwise around the other one-half of the cavity. The two streams merge and unite half way around the cavity where conduit 60, communicating with cavity 125, withdraws the stream. Each half of the air stream, by dividing as described, passes through ten screens so that a balanced pressure drop is achieved in each of the two streams. Since natural air flow over a floating roof tank causes a similar split or divided air flow in the rim space, it is clear that the described test apparatus simulates actual conditions quite closely.

Although wire screens are shown in the embodiment of FIGS. 8 and 9, other screens formed by perforating sheet metal or a resinous material can be used equally as well. Screens formed by molding, with the holes integrally formed, also can be used.

Although the invention herein described is particularly useful in measuring the effectiveness of a floating roof sealing system against emissions from petroleum storage tanks, with suitable changes in the type of emission monitoring equipment it could be used to measure other types of emissions, measured either separately or in combination.

The test cavity, formed in part by the envelope, should have a uniform cross-sectional area for a uniform air, or other gas, flow rate. Also, the cavity cross-section should be kept to a practical minimum to minimize the size of blower needed to achieve the simulated wind effect over the seal area. The cross-section should, however, be large enough to minimize local high velocity scour effects. In addition, by minimizing the cross-sectional air flow area, the total pressure force on the seal test envelope will be minimized and thus the attachment restraint requirements for the envelope to the floating roof and the tank wall will be minimized.

In addition to the methods already described herein for temporarily attaching the envelope to the roof and tank, it is also possible to use vacuum attachments, spring loaded attachments, weighted attachments, guy wire or tie rod tensioned attachments, and combinations of such attachments.

It is important to exercise care to properly ventilate the seal test cavity to avoid hazardous build-up of hydrocarbons or emissions during periods when seal emission testing is not in progress.

The described method and apparatus are simple to use and can be performed by personnel with little technical training. The apparatus is portable and can be moved readily from one tank to an adjacent tank, or from one storage tank location to another.

The described test method is particularly suitable for evaluating the equivalency of one seal to another seal, such as an environmentally approved or accepted seal. By measuring the emissions which flow past two different seals at the same air flow rate and pressure, a direct comparison of the seal's effectiveness is obtained.

The response time of the test method is quite fast and is completed often in a matter of minutes after the apparatus is installed. Because of the speed of the test method, the effect of different variables on the emission rate can be measured. Some such variables are ambient barometric pressure changes, ambient temperature changes, working losses due to a tank emptying process, the tightness of various seal components, product vapor pressure, and wind velcity.

The test method of this invention can be used with many types of seals including metallic shoe seals, foam filled seals, liquid filled seals, wiper seals, flapper seals, etc. It can also be used with many types of multiple seal construction incorporating primary, secondary, and tertiary seal elements. This test method can be used on most types of floating roof tanks, both new and old, riveted and welded, internal floating roof tanks and external floating roof tanks, metal shell and non-metallic shell, coated (or lined) shell and non-coated shell, and contact type and non-contact type (float type).

Rather than place a seal envelope around the entire circumference of a floating roof, it is also possible to place it on smaller segments of the seal to determine the local effectiveness of the seal. This would allow one in a maintenance check to locate areas where the seal had experienced severe deterioration. To perform tests on segments of the seal, it is necessary to place a suitable temporary gas flow isolation dam at the ends of the seal segment under test.

The test method can be used with many different stored liquid products, including a wide range of hydrocarbon products such as crude oils (ligh crudes, viscous crudes, high sulfur crudes, etc.); gasolines (automobile and aviation), distates, napthas, narrow-boiling fractions, pure compounds, high and low vapor pressure stocks, etc. It should be noted that the density change method of measuring hydrocarbon losses from floating roof tanks will not work with certain products such as viscous crude oils, narrow-boiling fractions, high vapor pressure stocks, and pure compounds.

This method may be termed a direct measurement method for measuring the emissions because it collects and measures the emissions directly, as opposed to other test methods which are indirect and measure changes in the stock volume or stock properties, or which use a tracer gas.

Because the response time of this test method is fast, it minimizes the time that the tank is out of service for testing. The precision involved in the individual measurements such as air flow rate, air temperature, air pressure, and total hydrocarbn concentration in the influent air and effluent air, can be quite high, and thus the overall precision of the measured emissions can also be quite high. The instruments used work well within the limits of the state-of-the-art, and the quantities being measured are not extremely small, as is the case in some other test methods which require the measurement of very small changes in stock properties.

The foregoing detailed description has been given for clearness of understanding only, and no unnecessary limitations should be understood therefrom, as modifications will be obvious to those skilled in the art.

What is claimed is:

1. A method of testing the effectiveness against leakage of a seal in a gap between two surfaces which comprises:
    positioning and securing an envelope means to span the seal and gap and extend to the two surfaces to thereby form an enclosed cavity or space defined by the two surfaces, the seal therebetween and the envelope means;
    feeding a gas stream into the cavity and removing the gas stream from the cavity; and
    analyzing the removed gas stream for any potential contaminant which leaks past the seal in the gap.

2. A method according to claim 1 in which spaced-apart screens are located laterally in the cavity to increase the gas stream pressure drop from one side of the screens to the other side.

3. A method according to claim 1 in which the envelope means comprises a flexible, gas impervious membrane.

4. A method according to claim 3 in which the membrane is an elongated strip joined at its longitudinal edges to the two surfaces thereby defining an elongated cavity.

5. A method according to claim 4 in which the gas stream is fed to one end of the cavity and is removed from the other end of the cavity.

6. A method according to claim 1 in which the seal is on a storage tank for a liquid product having a volatile component which constitutes the potential contaminant.

7. A method of testing the effectiveness against leakage of a seal of the rim space between a floating roof edge and a tank containing the floating roof, which comprises:
    positioning and securing an envelope means to extend from the floating roof edge to the tank wall over at least part of the length of the rim space to thereby form an enclosed cavity or space defined by the tank wall, the seal, the roof edge and the envelope means;
    feeding a gas stream into the cavity and removing the gas stream from the cavity; and
    analyzing the removed gas stream for any potential contaminant which leaks past the seal from a product stored in the tank.

8. A method according to claim 7 in which screens are laterally positioned across the cavity area to increase the pressure drop as the gas stream flows through the cavity.

9. A method according to claim 8 in which the number and size of the screens are suitably selected, and the flow rate of the gas stream is controlled to a preselected value, to simulate the same local air speed and circumferential pressure distribution that would be produced by a specific wind speed over the floating roof tank.

10. A method according to claim 7 in which the envelope means is closed at both ends.

11. A method according to claim 7 in which the envelope means comprises a flexible, gas impervious membrane.

12. A method according to claim 11 in which the membrane is an elongated strip thereby defining an elongated cavity, and the gas stream is fed to one end of the cavity and is removed from the other end of the cavity.

13. A method according to claim 7 in which the roof is floating on a liquid product containing a volatile component which constitutes the potential contaminant.

14. A method according to claim 7 in which the envelope extends completely around the roof edge over the entire rim space to the tank wall thereby defining a circular cavity, a barrier is placed in the cavity to substantially prevent gas flow from one side of the barrier to the other side, the gas stream is fed to the cavity close to one side of the barrier and the gas stream is removed from the cavity close to the other side of the barrier.

15. A method according to claim 7 in which the seal comprises shoes supported by the roof on pantagraph hangers and a flexible, gas impervious, fabric extends from the roof edge to the upper part of the shoes.

16. A method according to claim 7 in which the seal comprises a resilient polymeric foam horizontal ring between the roof and the tank wall.

17. A method according to claim 7 in which the seal comprises a liquid or gas filled flexible sheet material in a horizontal ring between the roof and the tank wall.

18. A method according to claim 7 in which the envelope is secured to the top edge of the tank wall.

19. Apparatus comprising:
a first object having a first surface;
a second object having a second surface;
a gap between the first and second surfaces;
a seal in the gap intended to restrict vapor flow from one side to the other side of the gap;
an envelope means spanning the seal and gap and joined to the first and second surfaces thereby forming an enclosed cavity or space defined by the first and second surfaces, the seal and the envelope means;
a first conduit means for feeding a gas stream through the envelope into the cavity; and
a second conduit means for removing a gas stream through the envelope from the cavity and delivering at least a part of the removed stream to an analyzer for a potential atmosphere contaminating vapor which leaks past the seal.

20. Apparatus comprising:
a storage tank having a circular cylindrical vertical wall;
a floating circular roof in the tank;
a rim space between the roof edge and the tank wall;
an envelope means secured to the floating roof edge and extending over at least part of the length of the rim space to, and secured to, the tank wall, thereby forming an enclosed curvilinear cavity or space defined by the tank wall, the seal, the roof edge and the envelope means;
a first conduit means for feeding a gas stream through the envelope into the cavity; and
a second conduit means for removing a gas stream from the cavity through the envelope and delivering at least a part of the removed stream to an analyzer for a potential atmosphere contaminating vapor which leaks past the seal.

21. Apparatus according to claim 20 in which a plurality of spaced-apart screens extend across the cavity area between the first conduit means for feeding the gas stream to the cavity and the second conduit means for removing the gas stream from the cavity.

22. Apparatus according to claim 21 in which the number and size of the screens is selected, along with the gas stream flow rate, to simulate the same local air speed and circumferential pressure distribution that would be produced above the seal by a specific wind speed over the floating roof tank.

23. Apparatus according to claim 20 in which an inlet end of the first conduit is joined to a pump for pumping an air stream into the cavity.

24. Apparatus according to claim 20 in which the envelope means is closed at both ends.

25. Apparatus according to claim 24 in which the envelope means comprises a flexible, gas impervious membrane.

26. Apparatus according to claim 25 in which the membrane is an elongated strip thereby defining an elongated curvilinear cavity, the first conduit communicates with one end of the cavity and the second conduit communicates with the other end of the cavity.

27. Apparatus according to claim 20 in which the roof is floating on a liquid product containing a volatile component which constitutes the potential atmosphere contaminating vapor.

28. Apparatus according to claim 20 in which the envelope extends completely around the roof edge over the entire rim space to the tank wall thereby defining a circular cavity, a barrier is in the cavity to substantially prevent gas or vapor flow from one side of the barrier to the other side, the first conduit communicates with the cavity close to one side of the barrier and the second conduit communicates with the cavity close to the other side of the barrier.

29. Apparatus according to claim 20 in which the seal comprises shoes supported by the roof on pantagraph hangers and a flexible, gas impervious, fabric extends from the roof edge to the upper part of the shoes.

30. Apparatus according to claim 20 in which the seal comprises a resilient polymeric foam horizontal ring between the roof and the tank wall.

31. Apparatus according to claim 20 in which the seal comprises a liquid or gas filled flexible sheet material in a horizontal ring between the roof and the tank wall.

32. Apparatus according to claim 20 in which the storage tank wall is farbricated by means of riveted construction.

33. Apparatus according to claim 20 in which the storage tank wall is fabricated by means of welded construction.

34. Apparatus according to claim 20 in which the envelope extends completely around the roof edge over the entire rim space to the tank wall thereby defining a circular cavity, and the second conduit communicates with the cavity about diametrically opposite the first conduit communication with the cavity.

35. Apparatus according to claim 34 in which spaced-apart screens extend across the cavity area in equal number and spacing in each semicircular segment of the cavity defined by the first and second conduits communication with the cavity.

36. Apparatus according to claim 20 in which the first conduit has means to regulate the flow rate of the gas stream to control it to a preselected value to simulate the same local air speed and circumferential pressure distribution above the seal that would be produced by a specific wind speed over the floating roof tank.

37. Apparatus comprising:
a first object having a first surface;
a second object having a second surface;
a gap between the first and second surfaces;
a seal in the gap intended to restrict vapor flow from one side to the other side of the gap;

an envelope means spanning the seal and gap and joined to the first and second surfaces thereby forming an enclosed cavity or space defined by the first and second surfaces, the seal and the envelope means;

a plurality of spaced-apart screens extending across the cavity area between the first conduit means for feeding the gas stream to the cavity and the second conduit means for removing the gas stream from the cavity;

a first conduit means for feeding a gas stream through the envelope into the cavity; and a second conduit means for removing a gas stream through the envelope from the cavity and delivering at least a part of the removed stream to an analyzer for a potential atmosphere contaminating vapor which leaks past the seal.

38. Apparatus comprising:
a first object having a first surface;
a first object having a second surface;
an elongated gap between the first and second surfaces;
a seal in the gap intended to restrict vapor flow from one side to the other side of the gap;
an envelope means comprising a flexible, gas impervious elongated strip membrane joined at its longitudinal edges to the first and second surfaces and spanning the seal and gap thereby forming an elongated enclosed cavity or space defined by the first and second surfaces, the seal and the envelope means;
a first conduit means for feeding a gas stream through the envelope into the cavity; and
a second conduit means for removing a gas stream through the envelope from the cavity and delivering at least a part of the removed stream to an analyzer for a potential atmosphere contaminating vapor which leads past the seal.

39. Apparatus according to claim 38 in which the first conduit means communicates with one end of the cavity, and the second conduit means communicates with the the other end of the cavity.

* * * * *

UNITED STATES PATENT AND TRADEMARK OFFICE
CERTIFICATE OF CORRECTION

PATENT NO. : 4,238,953
DATED : December 16, 1980
INVENTOR(S) : ROYCE JAY LAVERMAN It is certified that error appears in the above-identified patent and that said Letters Patent are hereby corrected as shown below:

Column 1, line 14, change "is is" to --it is--, line 53, change "wal" to --wall--; column 4, line 14, start a paragraph with "Fig. 5", line 17, start a paragraph with "Fig. 6", line 49, change "22" to --24--; column 5, line 55, change "emission" to --emissions--; column 6, line 63, change "flanger" to --flange--; column 7, lines 16 and 18, change "affects" to --effects--, line 23, change "spped" to --speed--; column 8, line 7, change "fram" to --frame--; column 9, line 15, change "velcity" to --velocity--; column 12, line 41, change "farbricated" to --fabricated--; column 14, line 22, delete the second "the".

Signed and Sealed this

Seventh Day of April 1981

[SEAL]

Attest:

RENE D. TEGTMEYER

Attesting Officer    Acting Commissioner of Patents and Trademarks